Patented Oct. 1, 1929

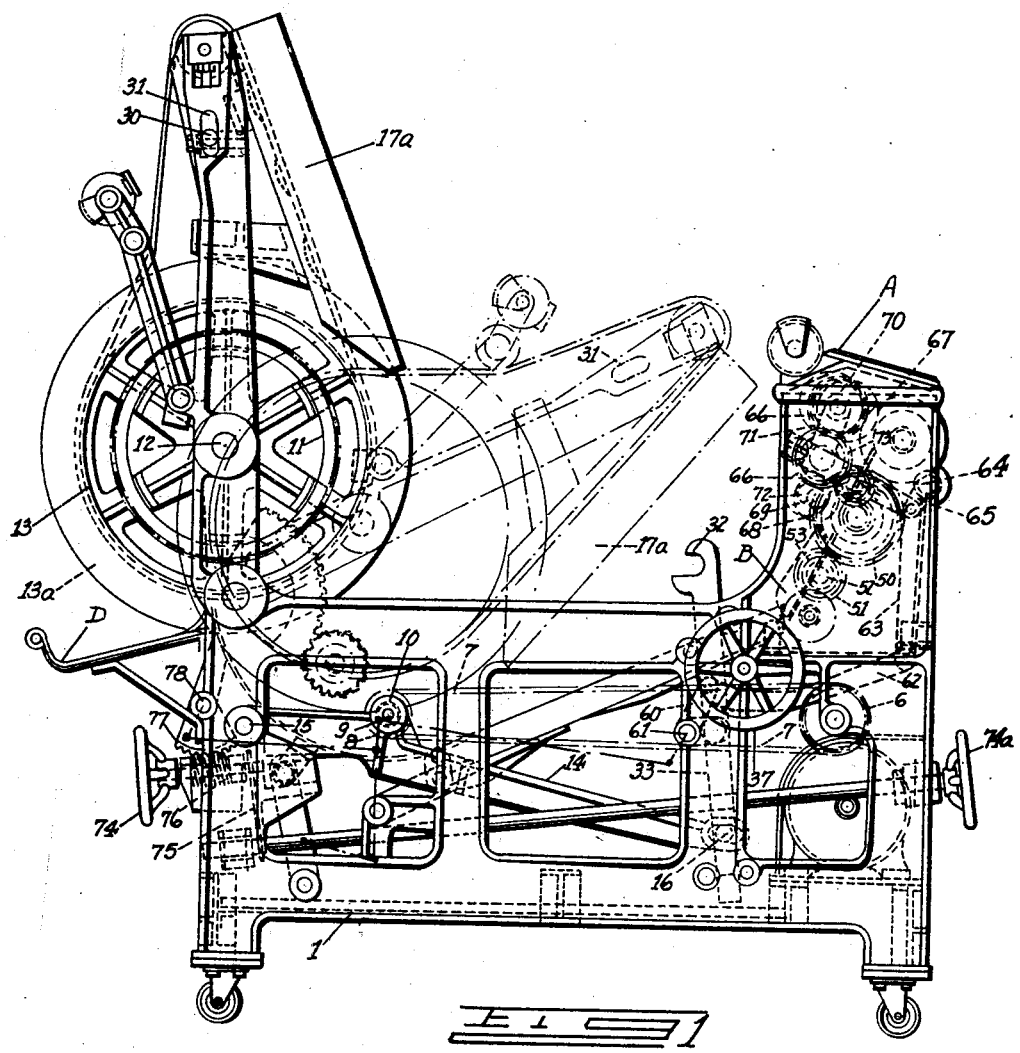

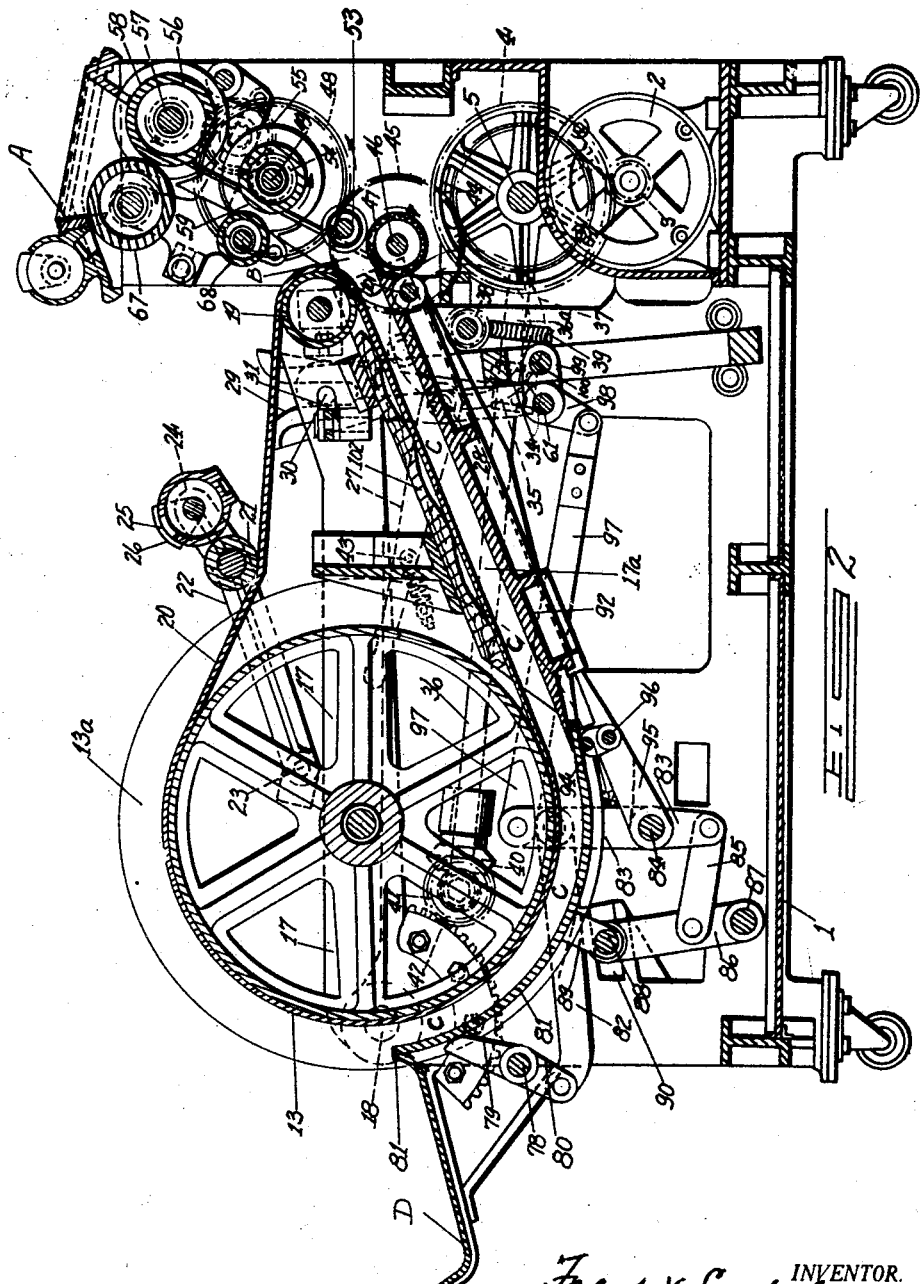

1,729,674

UNITED STATES PATENT OFFICE

FRANK X. LAUTERBUR AND EDWARD J. LAUTERBUR, OF SIDNEY, OHIO

DOUGH-MOLDING MACHINE

Application filed August 17, 1927. Serial No. 213,658.

Our invention relates to dough molding machines of the intermittent feed type in which batches of dough are intermittently fed into the machine and each batch is molded into a loaf. In the art there have been two main classes of dough molding machines. The first class is what may be called the belt conveyor type and as a good example of a successfully operative machine of this type reference is hereby made to the F. X. Lauterbur Patent #1,167,187, of January 4, 1916. The other type is what may be called the drum type and is exemplified in the F. X. Lauterbur Patent #1,585,724 of May 24, 1926.

In the first type of machine a quantity of dough is passed into a receiving pocket in the machine in which it is curled up into a cylindrical formation and then carried by a short belt conveyor into position to be moved into an elongated passage between a pressure board and a conveying pressure belt, in which passage the loaf is kneaded and discharged into the pan in which the loaf is to be baked.

In the second type of machine the partially formed loaf is discharged into a compartment or pocket where it is picked up by the outer periphery of a drum around which a circular pressure plate is extended in interspaced position, thereby forming a circular passage. The loaf is kneaded and molded during the passage around the periphery of the drum.

Broadly our invention has for its object the provision of a machine which shall be a combination of the drum and conveyor type, in which the good features of each type are employed and in which additional structural changes permit a number of novel functional advantages.

In all types of bread molding machines heretofore the problem of making the machine accessible at all times without changing certain fine adjustments has not been solved. It is our object to provide a machine which may be readily opened up for repairs, cleaning or replacement by a simple mechanical control which does not affect the adjustments for size and shape of loaf. If a mass of dough becomes jammed in the machines the operator in a very short interval may open up the machine, remove the jammed dough, replace his pressure units and start up the machine again. If the belt becomes covered with sticky dough the machine may be opened up and a new pressure belt be installed in a very short time, without changing the set position of the adjustments.

Another important object is the provision of a machine in which the dough being molded is at all times under a positive control. There are no pockets or spaces in which the loaf is not at all times supported in compressed position so that all tendency of the molded dough masses to become misshapen is avoided. With the increasing use of high speed mixers, there has been a tendency for doughs to became more and more lively, so that a machine which, at all times, keeps the molded loaf under positive control is an important development in the art.

The above and other objects to which reference will be made in the ensuing disclosure we accomplish by that certain arrangement and combination of parts of which we have shown a preferred embodiment.

Referring to the drawings:

Figure 1 is a side elevation of the machine in what we have called the open position.

Figure 2 is a sectional view of the machine in closed or operating position.

Generally indicated at 1 is the frame of the machine. The principle of operation of the machine will first be described without specific mention of the detail structure. A sheet of dough is discharged into the intake hopper A shown at the upper right hand corner of the illustrations from which hopper the sheet is carried by rollers into a curling compartment or pocket B where a roller rotating in a direction opposite to the feed roller coils the sheet on itself. When the size of the cylindrical coil or dough is large enough it is engaged by a pressure belt which passes around a small pulley at the intake end of the machine and around a large drum at the outlet end. The pressure belt carries the molded loaf through an elongated passage C between the belt and the pressure and kneading board where it is kneaded and formed. The loaf is finally discharged into the pan hopper D which is shown as a plate extending out to the left of each of the illustrations. The pressure belt assembly is pivotally mounted so that the assembly may be swung from the position in which it is shown in Figure 2 to the position in which it is shown in Figure 1, thus exposing the entire area in which the loaf is molded and kneaded.

The drive for the machine as indicated in Figure 2 is preferably provided with an electric motor such as we have indicated at 2. The motor may have a pinion 3 which engages and drives a gear wheel 4 on a jack shaft 5. On the jack shaft 5 as shown in Figure 2, there is indicated a sprocket 6 which carries and drives a chain 7. The chain engages a sprocket 8 mounted on a shaft 9. The shaft 9 has mounted thereon a pinion 10 which engages a large gear 11 which drives the drum shaft 12 on which the drum 13 is mounted. The shaft 9 is mounted on a lever arm 14 which is pivoted to the machine frame at 16. The lever 14 is connected at the position indicated at 16 to the lifting bar the purpose of which will be hereinafter described.

Referring now to Figure 2 it will be observed that the drum 13 is journaled in a frame 17 pivoted to the machine frame at 18. The frame 17 extends toward the intake end of the machine where a relatively small pulley 19 is journaled therein. The pressure belt 20 which is rotated in a clockwise direction with the rotation of drum 13 engages the drum 13 and the pulley 19 and is tensioned to a desired degree thereon by a tensioning pulley 21 journaled to an arm 22 pivoted to the frame 17 at 23. The belt tensioning device carries a flour sifter having a pulley 24 and belt 25 by which it is driven. When the machine is in operation if the pressure belt 20 becomes sticky because of the condition of the dough it will be a simple matter to place a small charge of flour in the hopper 26 of the flour sifter, and the flour will be automatically discharged onto the pressure belt by the rotation of the tensioning pulley 21.

Side guards comprising circular plates 13ª extending out beyond the periphery of the drum and side boards 17ª which are attached to the frame 17 provide the side enclosing walls for the kneading and molding passage.

The pressure belt assembly may be moved from operating position as indicated in Figure 2 to inoperative position as indicated in Figure 1 by the following described operation. Extending out from the machine frame as indicated in Figure 2 there is a control handle 27. The handle is mounted on a shaft 28 which carries fixedly mounted thereon a yoke 29. To disengage the pressure belt assembly the handle is depressed from the position shown in Figure 2 and the yoke 29 thus moved counterclockwise. A latch bar 30, as indicated in Figure 1, mounted in slots 31 in the frame 17 is thus moved to the left and the pressure belt assembly thus released from engagement with a hooked end 32 of the lifting bar 33. At the same time, as indicated in Figure 2, a lever arm 34 which is integrally formed with the yoke 29, carries a clutch sleeve 35 into engagement so that the shaft 36 may be rotated by the rotation of the forward end of the shaft 36ª. The shaft 36ª is rotated by a hand wheel 37 extending out from the machine frame. On the shaft of the hand wheel 37 there is a worm wheel 38 which engages a jaw faced worm wheel 39 which is fixedly mounted on the shaft 36ª. The shaft 36 when the clutch is engaged carries a bevel gear 40 which engages a combination gear 41. The gear 41 engages a quadrant 42 which is fixed to the frame 17. Thus by lowering the handle 27 and turning the hand wheel 37 the pressure belt assembly may be released and elevated so that the molding passage and the pressure board and coiling hopper of the machine is exposed. In elevated position it will also be a simple matter to remove the pressure belt 20 and insert a clean belt or one of a different type. It should also be noted that without first depressing the handle 27 no elevating movement will be caused by the rotation of the hand wheel 37. Thus a safety device is provided which prevents undesired release of the pressure belt assembly by inadvertent movement of the hand wheel. For holding the handle 27 in either in or out position we have provided a spring throw latch 43 which resiliently holds the handle 27 in whichever position it is manually moved.

The operation of the feed and coiling rollers is as follows, as shown in Figure 2: The jack shaft 5 carries a gear 44 which engages a gear 45 on a shaft 46 which carries the fluted coiling roller 47 which rotates in a clockwise direction. The gear 45 engages another gear 48 which is mounted on a shaft 49. On the shaft 49, as indicated in Figure 1, there is mounted a large gear wheel 50 which engages a gear wheel 51 on the shaft 52 of the feed roller 53, which rotates in a counter clockwise direction. As indicated in Figure 2 a gear 54 on the shaft 49 drives an idler gear 55 which engages a gear 56 on a shaft 57 of the upper feed roller 58. The lower feed roller 59 may be rotated by the shaft 49 on which it is mounted.

The feed rollers illustrated are of the flanged type which provide retainment for the sides of the dough sheet. We do not wish to be limited, however, to the particular type of feed rollers shown.

There is, as indicated in Figure 1, an arm 60 mounted on a shaft 61 and a connecting link 62 coupled to the arm 60 operates a combination lever 63 which is pivotally mounted on the shaft 64. A lever 65 extending from the combination lever 63 is coupled with a yoked frame 66. The yoked frame 66 carries the flanged feed rollers 67, 68 which are mounted on shafts 70, 69 respectively which have gears 71, 72 which engage an idler gear 73. Thus with the movement of the shaft 61 the relative position of the feed rollers 67, 68 with respect to the rollers 58 and 59 may be controlled. The movement of the yoke 66 only carries the feed roller gears 71, 72 back and forth a fraction of an inch from the fixed center of the idler so that the gears remain at all times in mesh.

The drive for the feed and fluted coiling rollers forms no particular feature of our invention as other combinations will serve equally as well. It is of some importance that the outer feed rollers be adjustable with relation to the inner feed rollers and by arranging so that the control is through the shaft 61, a simple arrangement which functions satisfactorily and automatically with the unit control for the pressure board and plate is provided.

We have shown in Figure 1 a unit control for governing the width of the passage down which the molded batches are conveyed. We have provided hand wheels 74, 74$^a$ at each end of the machine which are linked so as to perform the same function through the chain 75. A worm 76 is mounted on the shaft of the hand wheel 74. The worm 76 engages and actuates a quadrant 77. The quadrant is on a cross saft 78, as indicated in Figure 2. The shaft 78 carries its cam 79 and the lever 80. In increasing the width of the passage the cam 79 is rocked counter clockwise and the upper end of the pressure plate 81 drops away from the pressure belt on the drum. The lever 80 connects with a link 82 which is coupled to a double arm lever 83 which is fulcrumed on a shaft 84. The lower end of the lever 82 is connected with a link 85 to a lever 86 fulcrumed to the machine frame at 87 and pivotally mounted, as indicated at 88, at its other end on a boss 89 extending from the pressure plate 81. The pivot shaft 88 of the lever 86 is mounted in a groove 90 in the machine frame. The shaft 88 thus guides the pressure sheet 81 backward at the same time that the end tends to fall away. This tends to keep the level of the pan hopper 91 in a substantially constant horizontal place with relation to a predetermined position on the drum 13 at which the molded loaves tend to be discharged most readily. Other types of dough molders of the drum type have provided pressure plates which did not retain a substantially fixed horizontal position during adjustment so that our machine offers a functional advantage of decided merit as every drum type of molder has one position at which the dough discharges most readily.

The pressure board which we have indicated at 92 has a bracket 93 which carries a roller 94 which engages the intake end of the pressure plate 81. The shaft 84 is connected with a link 95 to the bracket 93 on which it is journaled at 96. The lever 83 at its upper end is pivotally connected to a link arm 97. The arm 97 is connected to a lever 98 which is connected to the shaft 61. Another arm 99 is fixedly mounted on the shaft 61 and this arm 99 at its other end is connected to a rod 100 which is mounted in the lifting bar 33. The front end of the pressure board 92 is pivotally mounted in the machine frame at 101.

Thus by following the various interconnecting mechanisms which we have described it will be apparent that by turning the adjustment wheel 74 the discharge end of the pressure plate is moved outwardly from the drum, the front end of the pressure plate is lowered, the lifting bar 33 elevates the frame carrying the pulley 19 so that the space within the front end of the kneading passage is widened out, and at the same time through the links 60, 62 and 63 the outer feed rollers are moved away from the feed rollers 58, 59 so that a thicker sheet of dough will be admitted.

The pressure belt as indicated passes over the kneading board 102 which permits the masses of dough as they are carried along with the belt to be kneaded in accordance with the plan suggested in the Lauterbur Patent #1,167,187.

Having thus described our invention what we claim as new and desire to secure by Letters Patent is:

1. A dough molding machine having at its intake end a series of interspaced rollers for feeding a sheet of dough into the machine, a reversing roller for coiling up a sheet of dough after it has been fed into the machine, a pressing belt for conveying coiled batches of dough through a molding and kneading passage and pressing devices forming an opposed wall of the passage against which the dough is pressed and kneaded by the pressing belt, said belt extending into such position with relation to the coiling roller as to engage the coiled batches of dough at the completion of the coiling operation and to remain in engagement with said coiled batch of dough at all times during its movement through the molding passage, and means for varying the height of the passage through which the coiled dough is passed, said means effective on the pressing belt at one end of the passage and on the pressing devices at the other end of the passage.

2. A dough molding machine having at its intake end a series of interspaced rollers for feeding a sheet of dough into the machine, a reversing roller for coiling up a sheet of dough after it has been fed into the machine, a pressing belt for conveying coiled batches of dough through a molding and kneading passage and pressing devices forming an opposed wall of the passage against which the dough is pressed and kneaded by the pressing belt, said belt extending into such position with relation to the coiling roller as to engage the coiled batches of dough at the completion of the coiling operation and to remain in engagement with said coiled batch of dough at all times during its movement through the molding passage, and means for varying the height of the passage through which the coiled dough is passed, said means effective on the pressing belt at one end of the passage and on the pressing devices at the other end of the passage, and a unit control for said means for varying the height of said passage.

3. A dough molding machine having at its intake end a series of interspaced rollers for feeding a sheet of dough into the machine, a reversing roller for coiling up a sheet of dough after it has been fed into the machine, a pressing belt for conveying coiled batches of dough through a molding and kneading passage and pressing devices forming an opposed wall of the passage against which the dough is pressed and kneaded by the pressing belt, said belt extending into such position with relation to the coiling roller as to engage the coiled batches of dough at the completion of the coiling operation and to remain in engagement with said coiled batch of dough at all times during its movement through the molding passage, and means for varying the height of the passage through which the coiled dough is passed, said means effective on the pressing belt at one end of the passage and on the pressing devices at the other end of the passage, and a unit control for said means for varying the height of said passage, and said unit control having interconnecting mechanism for co-operatively controlling the width of the passage between the series of interspaced feed rollers.

4. In a dough molding machine, means for feeding and coiling a batch of dough, means effective through the extent of a passage for molding and kneading the dough batch after the coiling operation, said means for pressing and kneading comprising a pressure belt passing over rolling supports which are mounted on a frame pivoted at the discharge end of the machine, and means for raising the frame at the end thereof opposite the pivoted end.

5. In a dough molding machine, means for feeding and coiling a batch of dough, means effective through the extent of a passage for molding and kneading the dough batch after the coiling operation, said means for pressing and kneading comprising a pressure belt passing over rolling supports which are mounted on a frame pivoted at the discharge end of the machine, and means for raising the frame at the end thereof opposite the pivoted end, said means for pressing and kneading comprising a drum at the discharge end of the machine and a relatively smaller roller mounted at that end of the frame which may be raised.

6. In a dough molding machine, means for feeding and coiling a batch of dough, means effective through the extent of a passage for molding and kneading the dough batch after the coiling operation, said means for pressing and kneading comprising a pressure belt passing over rolling supports which are mounted on a frame pivoted at the discharge end of the machine, and means for raising the frame at the end thereof opposite the pivoted end, said means for pressing and kneading comprising a drum at the discharge end of the machine and a relatively smaller roller mounted at that end of the frame which may be raised, pressure means in interspaced position from said pressing belt against which the coiled batch of dough is pressed, and means for varying the position of the pressing means at that end of the belt which passes over the drum.

7. In a dough molding machine, means for molding batches of dough in an elongated passage comprising an endless belt, having a drum at the discharge end of the machine over which the belt passes, and a relatively smaller pulley at the intake end of the machine, a frame in which said drum and said pulley is mounted, said frame being pivoted adjacent the discharge end of the machine.

8. In a dough molding machine, means for molding batches of dough in an elongated passage comprising an endless belt, having a drum at the discharge end of the machine over which the belt passes, and a relatively smaller pulley at the intake end of the machine, a frame in which said drum and said pulley is mounted, said frame being pivoted adjacent the discharge end of the machine, and means for elevating the pulley end of the said frame.

9. In a dough molding machine, means for molding batches of dough in an elongated passage comprising an endless belt, having a drum at the discharge end of the machine over which the belt passes, and a relatively smaller pulley at the intake end of the machine, a frame in which said drum and said pulley is mounted, said frame being pivoted adjacent the discharge end of the machine, said machine having relatively fixed pressing members in interspaced position from said belt and means for varying the relative interspaced distance between said belt and pressing members.

10. In a dough molding machine, means for molding batches of dough in an elongated passage comprising an endless belt, having a drum at the discharge end of the machine over which the belt passes, and a relatively smaller pulley at the intake end of the machine, a frame in which said drum and said pulley is mounted, said frame being pivoted adjacent the discharge end of the machine, said machine having relatively fixed pressing members in interspaced position from said belt and means for varying the relative interspaced distance between said belt and pressing members, said pressing members being pivotally mounted at the intake end thereof and adjustably mounted at the discharge end thereof.

11. In a dough molding machine, means for molding batches of dough in an elongated passage comprising an endless belt, having a drum at the discharge end of the machine over which the belt passes, and a relatively smaller pulley at the intake end of the machine, a frame in which said drum and said pulley is mounted, said frame being pivoted adjacent the discharge end of the machine, said machine having relatively fixed pressing members in interspaced position from said belt and means for varying the relative interspaced distance between said belt and pressing members, said pressing members being pivotally mounted at the intake end thereof and adjustably mounted at the discharge end thereof, and a unit control for varying uniformly the relative interspaced distance between said belt and pressing members.

12. In a dough molding machine, means for molding batches of dough in an elongated passage comprising an endless belt, having a drum at the discharge end of the machine over which the belt passes, and a relatively smaller pulley at the intake end of the machine, a frame in which said drum and said pulley is mounted, said frame being pivoted adjacent the discharge end of the machine, said machine having relatively fixed pressing members in interspaced position from said belt and means for varying the relative interspaced distance between said belt and pressing members, said pressing members being pivotally mounted at the intake end thereof and adjustably mounted at the discharge end thereof, said pressing members comprising a relatively flat pressure board, and a plate curved to conform to the shape of the drum.

13. In a dough molding machine, means for molding and kneading dough comprising an endless conveyor moving from its intake end through a flat plane and then passing about an arc of the periphery of a drum, said machine having supporting and pressing devices interspaced from said conveyor forming a passage through which successive dough batches are conveyed, said pressing devices comprising a flat pressure board extending throughout the flat plane of the passage and a curved plate extending throughout the curved portion of the passage, with means for adjusting the position of said board and plate.

14. In a dough molding machine, means for molding and kneading dough comprising an endless conveyor moving from its intake end through a flat plane and then passing about an arc of the periphery of a drum, said machine having supporting and pressing devices interspaced from said conveyor forming a passage through which successive dough batches are conveyed, said pressing devices comprising a flat pressure board extending throughout the flat plane of the passage and a curved plate extending throughout the curved portion of the passage, with means for adjusting the position of said board and plate, said curved plate provided with means for retaining its discharge end in a relatively fixed plane with reference to a predetermined radial line extending from the axis of said drum during the adjustment thereof.

15. In a dough molding machine, means for molding and kneading dough comprising an endless conveyor moving from its intake end through a flat plane and then passing about an arc of the periphery of a drum, said machine having supporting and pressing devices interspaced from said conveyor forming a passage through which successive dough batches are conveyed, said pressing devices comprising a flat pressure board extending throughout the flat plane of the passage and a curved plate extending throughout the curved portion of the passage, with means for adjusting the position of said board and plate, and means for adjusting the position of the conveyor at its intake end.

16. In a dough molding machine, means for molding and kneading dough comprising an endless conveyor moving from its intake end through a flat plane and then passing about an arc of the periphery of a drum, said machine having supporting and pressing devices interspaced from said conveyor forming a passage through which successive dough batches are conveyed, said pressing devices comprising a flat pressure board extending throughout the flat plane of the passage and a curved plate extending throughout the curved portion of the passage, with means for adjusting the position of said board and plate, and means for adjusting the position of the conveyor at its intake end, and a unit control for both said adjusting means.

17. In a dough molding machine, means for molding and kneading the dough comprising an endless conveyor moving from its intake end through a flat plane and then passing about an arc of the periphery of a drum, a belt tensioning device for keeping said conveyor substantially taut, and a flour sifting device actuated by said belt tensioning device.

FRANK X. LAUTERBUR.
EDWARD J. LAUTERBUR.